(12) United States Patent
Takenaka

(10) Patent No.: US 10,486,525 B2
(45) Date of Patent: Nov. 26, 2019

(54) INSTALLATION STRUCTURE OF IN-WHEEL MOTOR UNIT

(71) Applicant: TOYOTA JIDOSHA KABUSHIKI KAISHA, Toyota-shi, Aichi-ken (JP)

(72) Inventor: Hidehiro Takenaka, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/154,874

(22) Filed: Oct. 9, 2018

(65) Prior Publication Data
US 2019/0168604 A1 Jun. 6, 2019

(30) Foreign Application Priority Data
Dec. 4, 2017 (JP) .................... 2017-232833

(51) Int. Cl.
*B60K 7/00* (2006.01)
*B60K 17/04* (2006.01)
*F16C 35/00* (2006.01)
*B60G 7/00* (2006.01)
*B60G 21/05* (2006.01)

(52) U.S. Cl.
CPC ............ *B60K 7/0007* (2013.01); *B60G 7/001* (2013.01); *B60G 21/051* (2013.01); *B60K 17/043* (2013.01); *F16C 35/00* (2013.01); *B60G 2200/20* (2013.01); *B60G 2204/182* (2013.01); *B60G 2206/20* (2013.01); *B60G 2300/50* (2013.01); *B60K 2007/0092* (2013.01)

(58) Field of Classification Search
CPC ............. B60K 7/0007; B60G 2200/20; B60G 2204/182
See application file for complete search history.

(56) References Cited

U.S. PATENT DOCUMENTS 8,998,230 B2 * 4/2015 Lee .................. B60G 7/001
  280/124.128
2011/0132673 A1 * 6/2011 Kim .................. B60G 21/051
  180/61

(Continued)

FOREIGN PATENT DOCUMENTS

JP 2008-168742 A 7/2008
JP 2010-116017 A 5/2010

(Continued)

*Primary Examiner* — Brian L Swenson
(74) *Attorney, Agent, or Firm* — Sughrue Mion, PLLC

(57) ABSTRACT

An installation structure of an in-wheel motor unit including a motor, a speed reducer, and a housing, for installing the in-wheel motor unit on a carrier of a suspension apparatus such that the housing is sandwiched by and between the carrier and a bearing unit, wherein the bearing unit and the housing are fastened at first fastening positions, and the carrier and the housing are fastened at second fastening positions the number of which is the same as that of the first fastening positions, wherein each first fastening position and the corresponding second fastening position form a pair, so as to provide a plurality of fastening-position pairs, and wherein the first and second fastening positions of each pair are located at the same position or located close to each other when viewed in a wheel axis direction which is a direction in which a rotation axis of a wheel extends.

8 Claims, 7 Drawing Sheets

(56) References Cited

U.S. PATENT DOCUMENTS

| | | | |
|---|---|---|---|
| 2014/0138171 A1* | 5/2014 | Mair | B60K 7/0007 |
| | | | 180/55 |
| 2015/0203159 A1 | 7/2015 | Tamura et al. | |
| 2015/0210154 A1* | 7/2015 | Tamura | B60K 7/0007 |
| | | | 180/55 |

FOREIGN PATENT DOCUMENTS

| | | |
|---|---|---|
| JP | 2014-054918 A | 3/2014 |
| JP | 2014-054919 A | 3/2014 |

* cited by examiner

INSTALLATION STRUCTURE OF IN-WHEEL MOTOR UNIT

CROSS REFERENCE TO RELATED APPLICATION

The present application claims priority from Japanese Patent Application No. 2017-232833, which was filed on Dec. 4, 2017, the disclosure of which is herein incorporated by reference in its entirety.

BACKGROUND

Technical Field

The following disclosure relates to a structure of a vehicle equipped with an in-wheel motor and more particularly to an installation structure for installing, on the vehicle, an in-wheel motor unit including the in-wheel motor.

Description of Related Art

There have been recently studied a number of in-wheel motors. The in-wheel motor is a motor housed in a wheel for driving the wheel. In general, the in-wheel motor is housed in a housing together with a speed reducer, etc., as a unit. There have been proposed means for installing the in-wheel motor unit on the vehicle, namely, an installation structure of the in-wheel motor unit on the vehicle, as described in Japanese Patent Application Publication No. 2014-054919, for instance. Typically, in vehicles not equipped with the in-wheel motor, a bearing unit rotatably holding the wheel is fixed to a carrier which is a constituent element of a suspension apparatus and which moves upward and downward relative to a body of the vehicle. In the installation structure of the in-wheel motor unit described in the Publication, the in-wheel motor unit is connected to the bearing unit, and the carrier is shaped such that one end portion thereof is fixed to the bearing unit and the other end portion thereof extends to an inner side of the in-wheel motor unit in a width direction of the vehicle so as to cover the in-wheel motor unit. In the thus constructed installation structure, a load of the vehicle body and a force from the wheel are prevented from acting on the in-wheel motor unit.

SUMMARY

There remains, however, much room for improvement in the installation structure for installing the in-wheel motor unit on the vehicle, and various modifications to the in-wheel motor unit of the installation structure improve the utility of the in-wheel motor. Accordingly, the present disclosure relates to an installation structure of an in-wheel motor unit for achieving an in-wheel motor having high utility.

One aspect of the present disclosure is directed to an installation structure for installing an in-wheel motor unit such that a housing of the in-wheel motor unit is sandwiched by and between a carrier and a bearing unit, wherein the bearing unit and the housing are fastened at a plurality of first fastening positions, and the carrier and the housing are fastened at a plurality of second fastening positions the number of which is the same as the number of the plurality of first fastening positions. Further, each of the plurality of first fastening positions and a corresponding one of the plurality of second fastening positions form a pair, so as to provide a plurality of fastening-position pairs, and the first fastening position and the second fastening position of each of the plurality of fastening-position pairs are located at the same position or located close to each other when viewed in a wheel axis direction, the wheel axis direction being a direction in which a rotation axis of the wheel extends.

ADVANTAGEOUS EFFECTS

In the installation structure of the in-wheel motor unit of the present disclosure, each of the fastening positions of the bearing unit to the housing and a corresponding one of the fastening positions of the carrier to the housing form a fastening-position pair, and a distance between the two fastening positions in each pair is relatively small. According to the installation structure of the present disclosure, a force that deforms the housing of the in-wheel motor unit can be made relatively small with respect to an externally applied force to the vehicle, resulting in a reduction of the weight of the housing, for instance.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Figure 1:
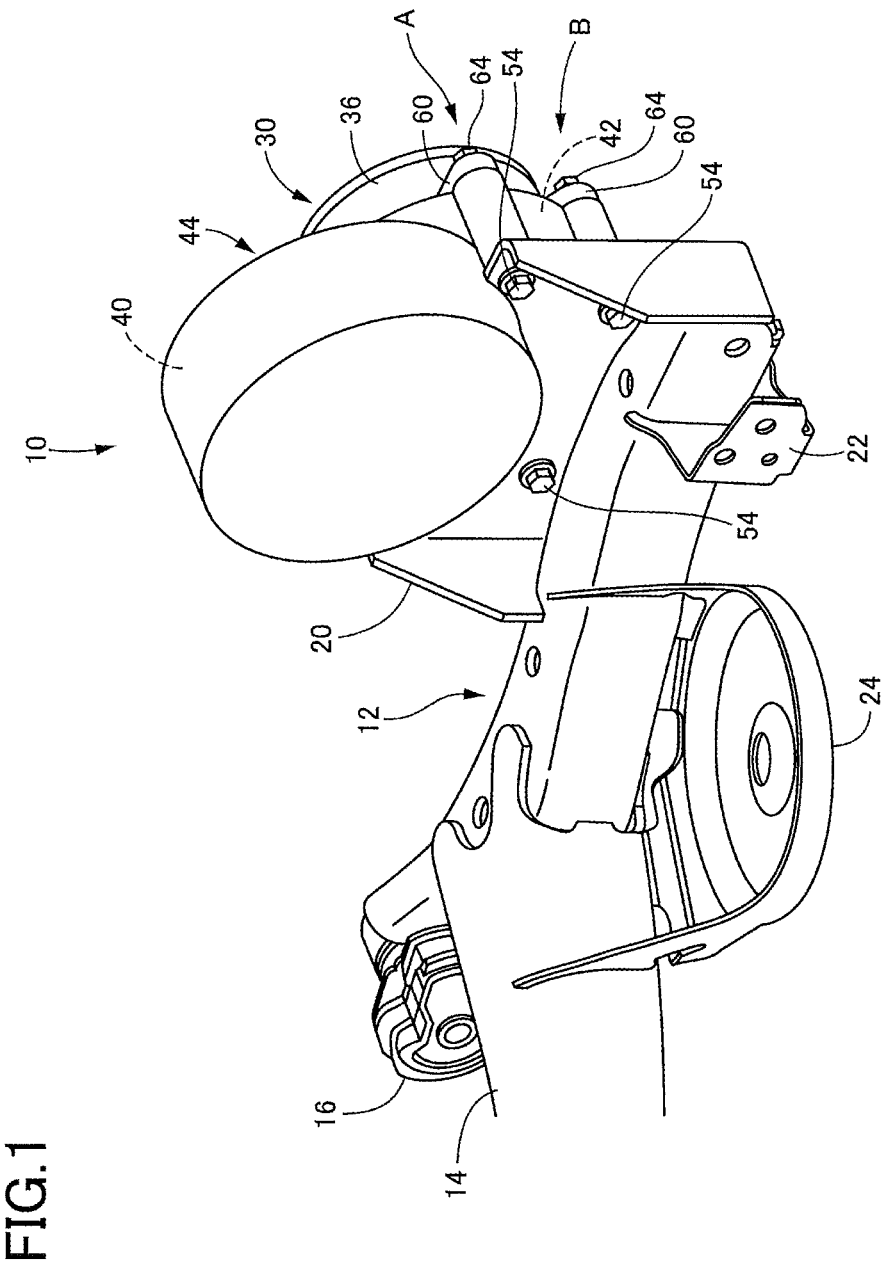
FIG. 1 is a perspective view of an installation structure of an in-wheel motor unit according to a first embodiment.

Referring to the drawings, there will be explained below in detail embodiments of the invention. It is to be understood that the invention is not limited to the details of the following embodiments but may be embodied with changes and modifications based on the knowledge of those skilled in the art.

1. First Embodiment

An installation structure of an in-wheel motor unit according to a first embodiment is employed for each of rear right and left wheels. FIGS. 1-5 show the installation structure of the in-wheel motor unit 10 employed for a rear right wheel. A suspension apparatus for the rear wheels, in each of which the present installation structure is employed, is a torsion-beam type suspension apparatus. The suspension apparatus includes: a pair of trailing arms 12 respectively provided for the rear right and left wheels and extending in a front-rear direction of the vehicle; and a cross beam 14 provided so as to extend in a width direction of the vehicle between the two trailing arms 12 corresponding to the respective rear right and left wheels.

Each of the trailing arms 12 is connected to the vehicle body at a pivot 16 provided at its front end portion, so as to be pivotable about the pivot 16. A carrier 20 is fixed to a rear end portion of each trailing arm 12 for holding the corresponding rear wheel. That is, each of the rear right and left wheels is moved in an up-down direction with a pivotal movement of a corresponding one of the trailing arms 12. A connecting portion 22, to which a lower end of a shock absorber is connected, is provided at a rear end portion of each trailing arm 12 so as to be located on an inner side of the trailing arm 12 in the vehicle width direction. Further, a lower seat 24 of a suspension spring is fixed to a connected portion of each trailing arm 12 and the cross beam 14, specifically, a portion located on a rear side of the cross beam 14 in the front-rear direction of the vehicle and on the inner side of each trailing arm 12 in the vehicle width direction, such that the lower seat 24 is attached across the cross beam 14 and the corresponding trailing arm 12. The cross beam 14 is twisted by roll or the like of the vehicle body when a movement amount in the up-down direction differs between the rear right wheel and the rear left wheel, so as to function as a stabilizer.

Each of the rear right and left wheels is rotatably held by a corresponding bearing unit 30. The bearing unit 30 includes an inner race 32 and an outer race 34 rotatably holding the inner race 32. The inner race 32 protrudes outwardly from the outer race 34 toward the corresponding rear wheel, and a hub 36 is fitted on the protruding portion of the inner race 32. Hub bolts (not shown) are fitted in respective five bolt holes 38 formed in the hub 36, whereby a wheel body of the rear wheel is fixed by the hub bolts. The outer race 34 is fixed to the carrier 20 with the in-wheel motor unit 10 interposed or sandwiched therebetween.

Figure 5:
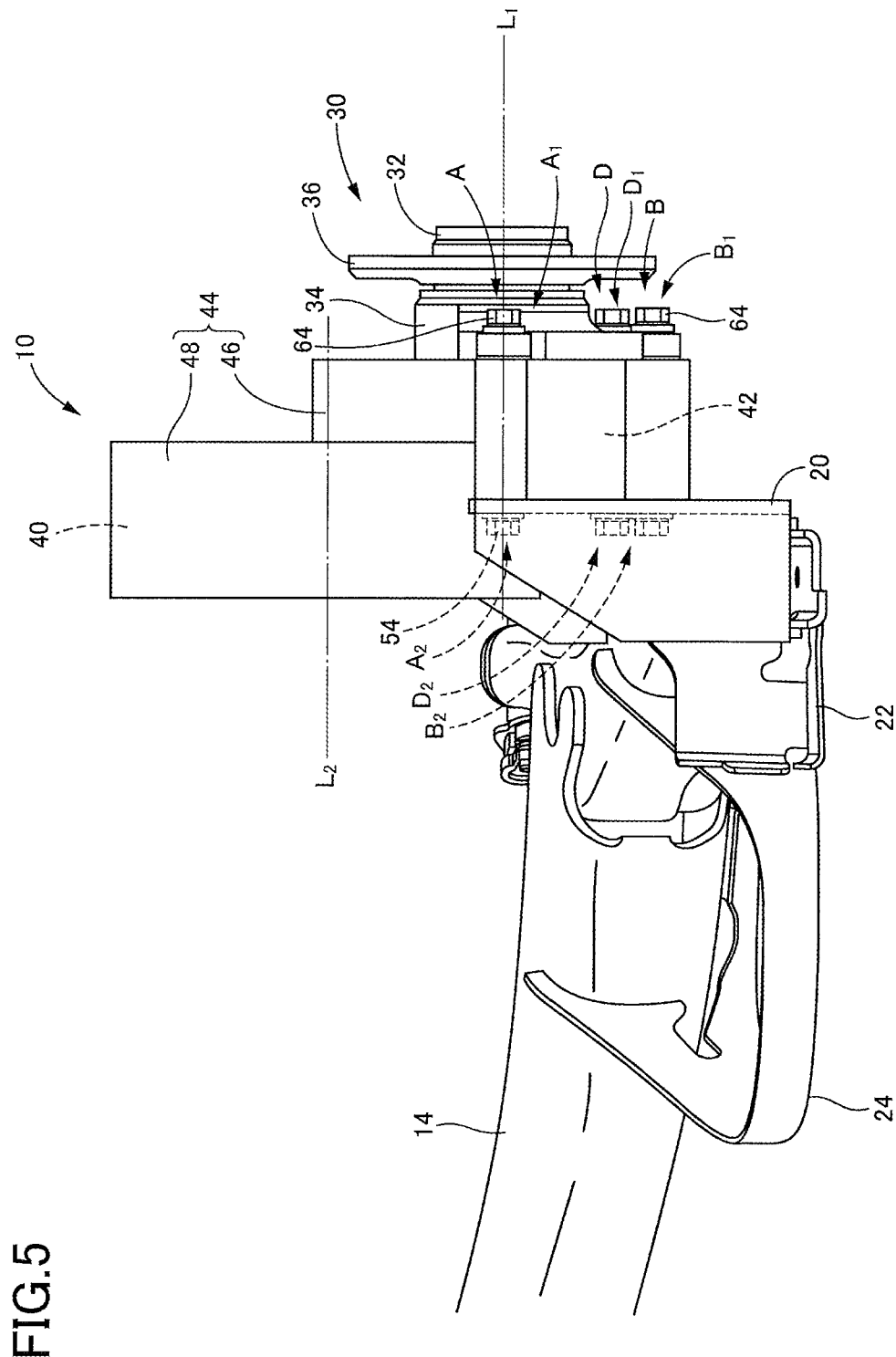
FIG. 5 is a view of the installation structure of the in-wheel motor unit according to the first embodiment, the view seen from a rear side of a vehicle.

The in-wheel motor unit 10 includes a motor 40 for driving the corresponding rear wheel, a speed reducer 42 configured to transmit, to the rear wheel, rotation of the motor 40 while reducing a speed of the rotation, and a housing 44 in which the motor 40 and the speed reducer 42 are housed. Illustration of an inside of the in-wheel motor unit 10, namely, illustration of structures of the motor 40 and the speed reducer 42, is omitted and briefly explained. There may be employed, as the speed reducer 42, various types of speed reducers such as a planetary gear mechanism. The speed reducer 42 is housed in a speed-reducer housing portion 46 of the housing 44. The motor 40 includes a rotor and a stator and is housed in a motor housing portion 48 of the housing 44. Each of the speed-reducer housing portion 46 and the motor housing portion 48 is generally shaped like a cylinder. As shown in FIG. 5, an axis $L_1$ of the speed-reducer housing portion 46 and an axis $L_2$ of the motor housing portion 48 are shifted relative to each other in the up-down direction. The motor housing portion 48 is disposed on one of opposite sides of the speed-reducer housing portion 46 on which the carrier 20 is disposed. That is, the motor 40 is disposed on the one of opposite sides of the speed reducer 42 in a wheel axis direction that is remote from the bearing unit 30. The wheel axis direction means a direction in which a rotation axis of the wheel extends.

The speed reducer 42 includes an output shaft to the rear wheel. The axis $L_1$ of the speed-reducer housing portion 46 coincides with a rotation axis of the output shaft of the speed reducer 42. The output shaft of the speed reducer 42 is connected to the inner race 32 of the bearing unit 30. That is, the rotation axis of the output shaft of the speed reducer 42 coincides with the rotation axis of the rear wheel. A rotation axis of the motor 40 coincides with the axis $L_2$ of the motor housing portion 48. The motor 40 is disposed such that the rotation axis thereof is shifted upward with respect to the rotation axis of the output shaft of the speed reducer 42.

As explained above, the in-wheel motor unit 10 is installed so as to be sandwiched by and between the outer race 34 of the bearing unit 30 and the carrier 20. Hereinafter, the installation structure of the in-wheel motor unit 10 will be explained in detail.

Figure 2:
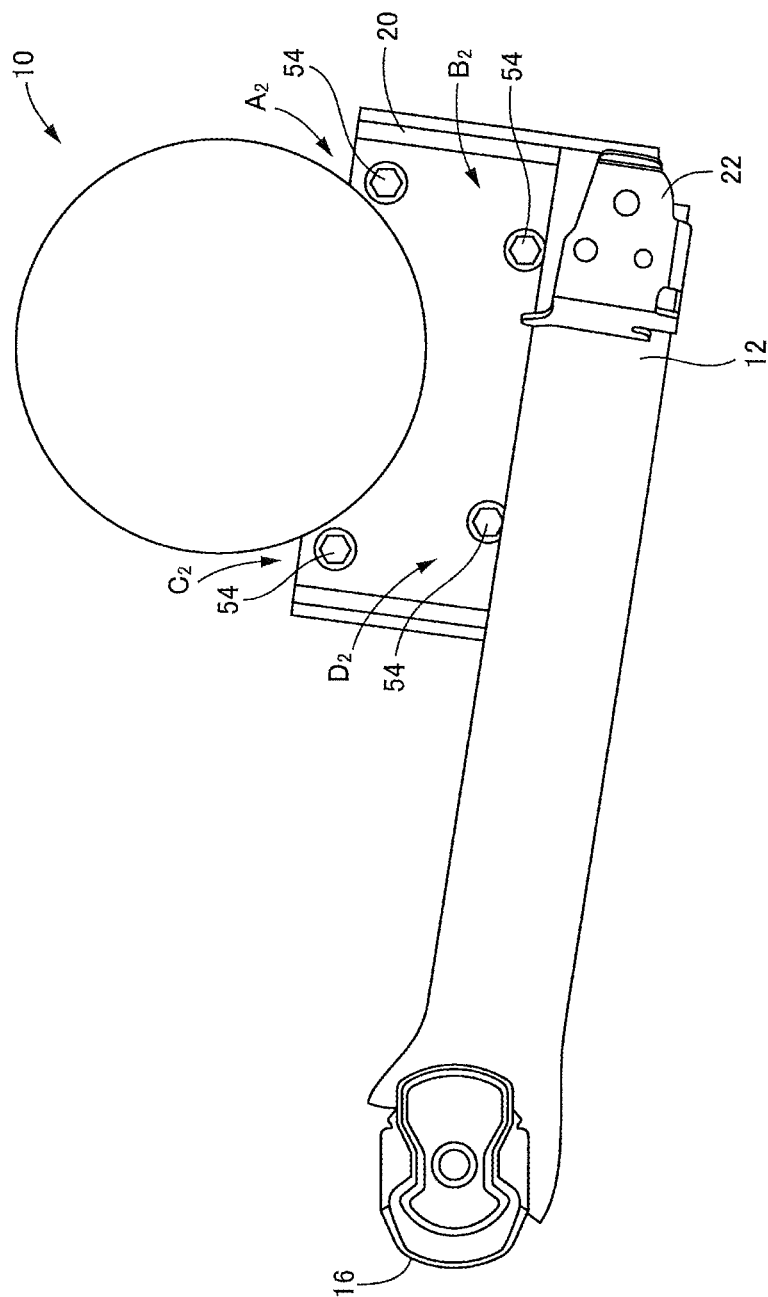
FIG. 2 is a side view of the installation structure of the in-wheel motor unit according to the first embodiment, the view seen from a carrier side.
Figure 3:
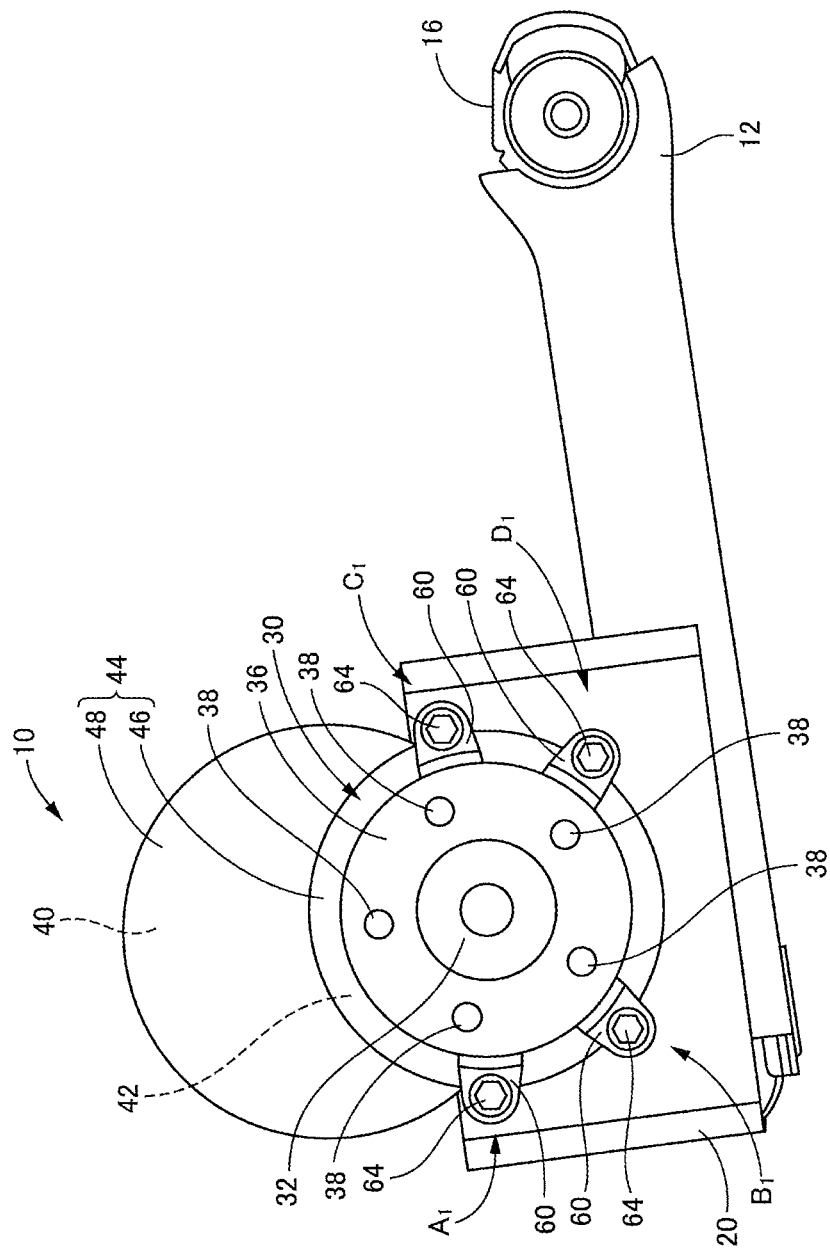
FIG. 3 is a side view of the installation structure of the in-wheel motor unit according to the first embodiment, the view seen from a bearing unit side.
Figure 6:
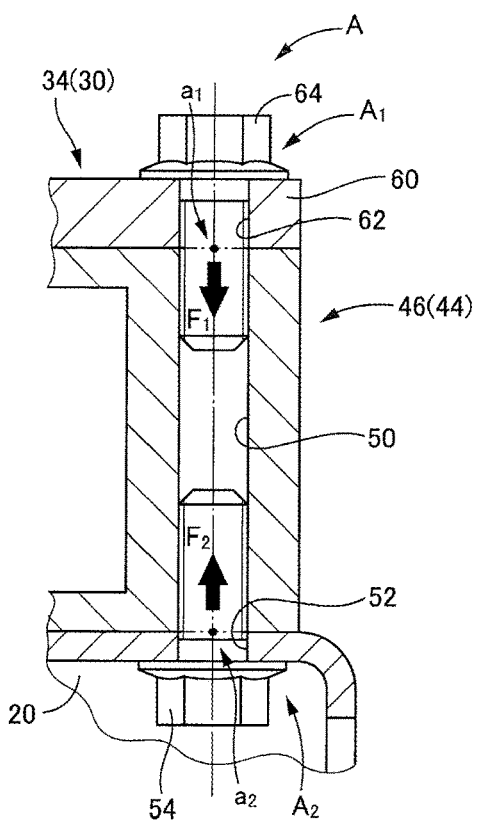
FIG. 6 is an enlarged cross-sectional view of one of a plurality of fastening-position pairs shown in FIG. 1.

As explained above, in the in-wheel motor unit 10, the motor 40 is shifted with respect to the speed reducer 42. The in-wheel motor unit 10 is installed such that the speed-reducer housing portion 46 of the housing 44 is sandwiched by and between the outer race 34 and the carrier 20. As shown in FIG. 3, the housing 44 of the in-wheel motor unit 10 and the outer race 34 of the bearing unit 30 are fastened to each other at four first fastening positions $A_1$, $B_1$, $C_1$, and $D_1$. As shown in FIG. 2, the housing 44 of the in-wheel motor unit 10 and the carrier 20 are fastened to each other at four second fastening positions $A_2$, $B_2$, $C_2$, and $D_2$. In the installation structure of the in-wheel motor unit 10 according to the present embodiment, the first fastening position $A_1$ and the second fastening position $A_2$, the first fastening position $B_1$ and the second fastening position $B_2$, the first fastening position $C_1$ and the second fastening position $C_2$, and the first fastening position $D_1$ and the second fastening position $D_2$ respectively form fastening-position pairs A, B, C, and D. Because the four fastening-position pairs A, B, C, and D are identical in structure, the fastening-position pair A is shown in FIG. 6 as a representative example.

Four through-holes 50 are formed through the speed-reducer housing portion 46 of the housing 44 so as to extend in the direction in which the rotation axis of the rear wheel extends. Each of the four through-holes 50 is an internally threaded hole in which internal threads are formed at least at its opposite ends. (Hereinafter, the through-hole 50 will be referred to as an internally threaded hole 50.) Four mounting holes 52 are formed through the carrier 20 so as to correspond to the respective four internally threaded holes 50 of the housing 44. Each of four bolts 54 is inserted into a corresponding one of the four mounting holes 52 of the carrier 20 and is threadedly engaged with a corresponding one of the four internally threaded holes 50 of the housing 44, whereby the carrier 20 and the housing 44 of the in-wheel motor unit 10 are fastened to each other.

Figure 4:
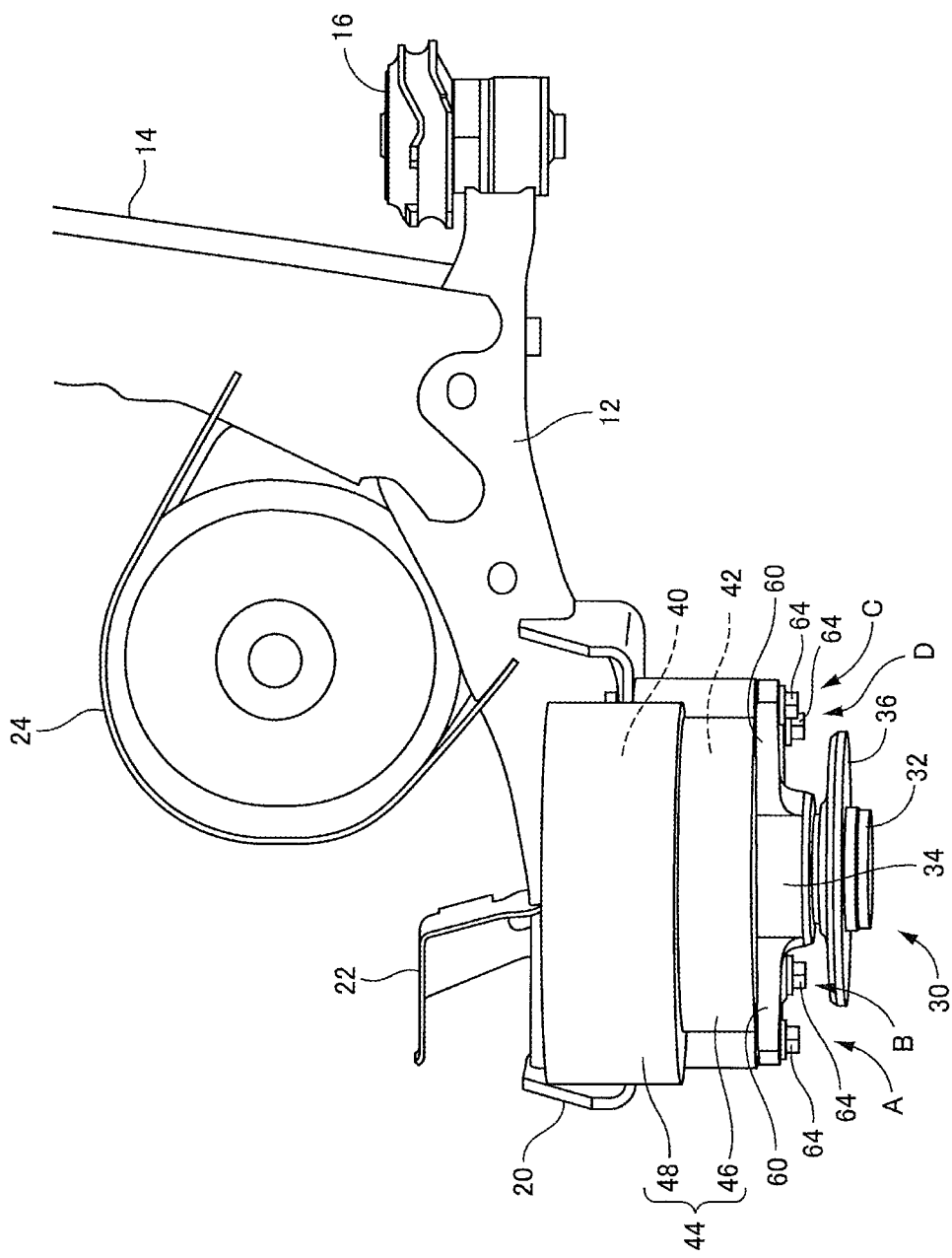
FIG. 4 is a plan view of the installation structure of the in-wheel motor unit according to the first embodiment, the view seen from above.

As shown in FIGS. 3 and 4, the outer race 34 of the bearing unit 30 includes four mounting portions 60 each extending in a direction orthogonal to the axis $L_1$. A mounting hole 62 is formed through each of the four mounting portions 60 so as to extend in the wheel axis direction. Each of four bolts 64 is inserted into a corresponding one of the four mounting holes 62 of the outer race 34 and is threadedly engaged with a corresponding one of the four internally threaded holes 50 of the housing 44, whereby the outer race 34 and the housing 44 of the in-wheel motor unit 10 are fastened.

The first fastening position is indicated by a first fastening point which is a center of the first fastening position on a plane on which the housing 44 of the in-wheel motor unit 10 and the outer race 34 of the bearing unit 30 are in contact with each other. Similarly, the second fastening position is indicated by a second fastening point which is a center of the second fastening position on a plane on which the housing 44 of the in-wheel motor unit 10 and the carrier 20 are in contact with each other. Specifically, as shown in FIG. 6, a first fastening point $a_1$ is a point of intersection of: the plane on which the housing 44 of the in-wheel motor unit 10 and the outer race 34 of the bearing unit 30 are in contact with each other; and an axis of the bolt 64. Further, a second fastening point $a_2$ is a point of intersection of: the plane on which the housing 44 of the in-wheel motor unit 10 and the carrier 20 are in contact with each other; and an axis of the bolt 54. As apparent from FIG. 6, the first fastening point $a_1$ and the second fastening point $a_2$ are located at the same position when viewed in the wheel axis direction. That is, the first fastening position $A_1$ and the second fastening position $A_2$ are located at the same position when viewed in the direction in which the rotation axis of the rear wheel extends, namely, in the wheel axis direction.

In the installation structure of the in-wheel motor unit 10 according to the present embodiment, a distance between: the first fastening point $a_1$ of the fastening position at which the outer race 34 of the bearing unit 30 and the housing 44 of the in-wheel motor unit 10 are fastened to each other; and the second fastening point $a_2$ of the fastening position at which the carrier 20 and the housing 44 of the in-wheel motor unit 10 are fastened to each other is relatively small. Thus, a force that deforms the housing 44 of the in-wheel motor unit 10 can be made small with respect to an externally applied force to the vehicle. Further, in the case where lateral acceleration is generated in the vehicle, a direction of a force $F_1$ that acts on the first fastening point $a_1$ in dependence on the lateral acceleration and a direction of a force $F_2$ that acts on the second fastening point $a_2$ in dependence on the lateral acceleration are mutually opposite in the wheel axis direction. Accordingly, the force that deforms the housing 44 of the in-wheel motor unit 10 does not act on the housing 44.

In the installation structure according to the present embodiment, the in-wheel motor unit 10 is configured such that the motor 40 is shifted with respect to the speed reducer 42, and the in-wheel motor unit 10 is installed such that the speed reducer housing portion 46 of the housing 44 is sandwiched by and between the bearing unit 30 and the carrier 20. Accordingly, the distance between the first fastening position and the second fastening position is smaller in the present installation structure than an installation structure employed for an in-wheel motor unit in which the rotation shaft of the motor 40 and the output shaft of the speed reducer 42 are coaxial with each other.

In the installation structure according to the present embodiment, the first fastening position and the second fastening position of each of the four fastening-position pairs are provided utilizing the internally threaded hole 50 formed through the speed-reducer housing portion 46 of the housing 44 of the in-wheel motor unit 10 so as to extend in the wheel axis direction. The first fastening position and the second fastening position may be provided utilizing two internally threaded holes which are blind holes provided coaxially in the wheel axis direction and opening in opposite sides.

2. Second Embodiment

Figure 7:
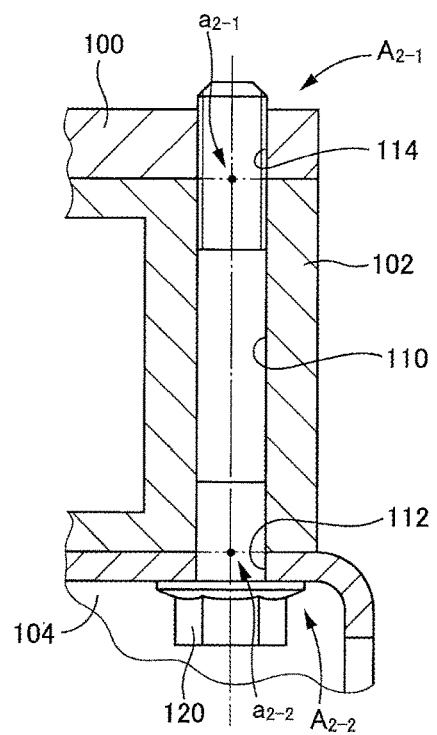
FIG. 7 is an enlarged cross-sectional view of one of a plurality of fastening-position pairs in an installation structure of an in-wheel motor unit according to a second embodiment.

An installation structure of an in-wheel motor unit according to a second embodiment is substantially identical with the installation structure according to the first embodiment. An outer race 100 of the bearing unit and a housing 102 of the in-wheel motor unit are fastened at four first fastening positions, and a carrier 104 and the housing 102 of the in-wheel motor unit are fastened at four second fastening positions. As in the installation structure of the first embodiment, each of the four first fastening positions and a corresponding one of the four second fastening positions form a pair, so as to provide four fastening-position pairs. FIG. 7 shows a cross section of one of the four fastening-position pairs.

The housing 102 of the in-wheel motor unit has four through-holes 110 corresponding to the four fastening-position pairs. The carrier 104 has four through-holes 112, each as a mounting hole, corresponding to the four fastening-position pairs. The outer race 100 of the bearing unit has four internally threaded holes 114, each as a mounting hole, corresponding to the four fastening-position pairs. Each internally threaded hole 114 has an inner circumferential surface on which internal threads are formed. A single bolt 120 is inserted into a corresponding one of the through-holes 112 of the carrier 104 and a corresponding one of the through-holes 110 of the housing 102 and is threadedly engaged with a corresponding one of the internally threaded holes 114 of the outer race 100, whereby the carrier 104, the housing 102, and the outer race 100 are fastened to one another.

As shown in FIG. 7, in the installation structure according to the second embodiment, a first fastening point $a_{2-1}$ of a first fastening position $A_{2-1}$ is a point of intersection of: a plane on which the housing 102 of the in-wheel motor unit and the outer race 100 of the bearing unit are in contact with each other; and an axis of the bolt 120. Similarly, a second fastening point $a_{2-2}$ of a second fastening position $A_{2-2}$ is a point of intersection of: a plane on which the housing 102 of the in-wheel motor unit and the carrier 104 are in contact with each other; and the axis of the bolt 120. As apparent from FIG. 7, the first fastening point $a_{2-1}$ and the second fastening point $a_{2-2}$ are located at the same position when viewed in the wheel axis direction. That is, the first fastening position $A_{2-1}$ and the second fastening position $A_{2-2}$ are located at the same position when viewed in the wheel axis direction. Accordingly, also in the installation structure of the second embodiment, a force that deforms a housing 102 of the in-wheel motor unit does not act on the housing 102 in the case the lateral acceleration is generated in the vehicle. While, in the second embodiment, the internally threaded holes are formed in the outer race 100, through-holes, each as a mounting hole, may be formed in the outer race 100 in place of the internally threaded holes and the outer race 100, the housing 102, and the carrier 104 may be fastened by nuts.

3. Third Embodiment

From the viewpoint of reducing the force that deforms the housing of the in-wheel motor unit, it is desirable that the first fastening position and the second fastening position in each of the plurality of fastening-position pairs be located at the same position when viewed in the wheel axis direction as in the installation structures of the illustrated two embodiments. The first fastening position and the second fastening position may be located close to each other when viewed in the wheel axis direction. In an installation structure of an in-wheel motor unit according to the following third embodiment, the first fastening position and the second fastening position of each fastening-position pair are located close to each other when viewed in the wheel axis direction.

Figure 8:
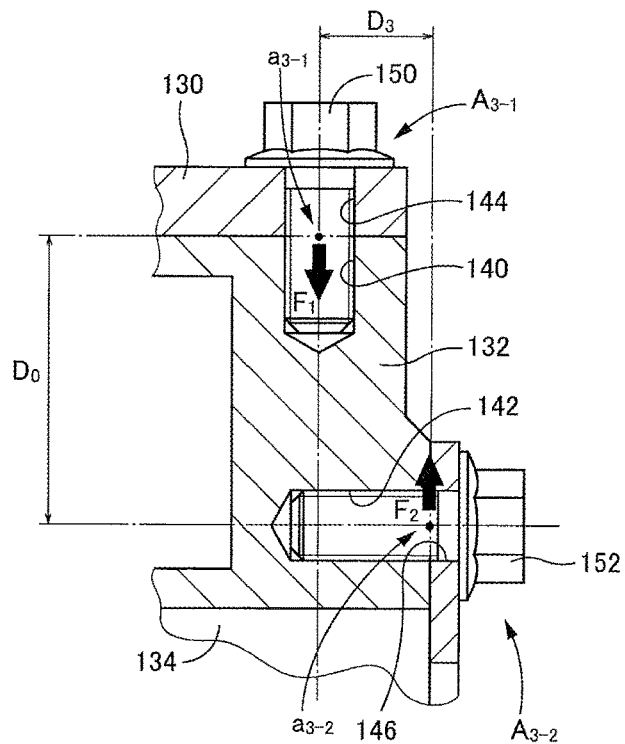
FIG. 8 is an enlarged cross-sectional view of one of a plurality of fastening-position pairs in an installation structure of an in-wheel motor unit according to a third embodiment.

In the installation structure of the in-wheel motor unit according to the third embodiment, an outer race 130 of the bearing unit and a housing 132 of the in-wheel motor unit are fastened at four first fastening positions, and a carrier 134 and the housing 132 of the in-wheel motor unit are fastened at four second fastening positions, as in the illustrated two embodiments. Each of the four first fastening positions and a corresponding one of the four second fastening positions form a pair, so as to provide four fastening-position pairs. FIG. 8 shows a cross-section of one of the four fastening-position pairs, and the following explanation will be made focusing on the one fastening-position pair.

The housing 132 of the in-wheel motor unit includes two internally threaded holes for each of the four fastening-position pairs. As shown in FIG. 8, one of the two internally threaded holes, namely, a first internally threaded hole 140, is provided for the first fastening position. The first internally threaded hole 140 extends in the wheel axis direction so as to be open to the outer race 130. The other of the two internally threaded holes, namely, a second internally threaded hole 142, is provided for the second fastening position. The second internally threaded hole 142 extends in a direction orthogonal to the wheel axis direction. At the second fastening position shown in FIG. 8, the internally threaded hole 142 is open toward the rear side of the vehicle. The second internally threaded hole 142 is provided so as to intersect an axis of the first internally threaded hole 140.

As shown in FIG. 8, a mounting hole 144 is formed in the outer race 130 of the bearing unit so as to correspond to the first internally threaded hole 140. A rear-side portion and a front-side portion of the carrier 134 are formed as extending portions. A mounting hole 146 is formed in each of the extending portions of the carrier 134 so as to correspond to the second internally threaded hole 142. A first bolt 150 is inserted into the mounting hole 144 of the outer race 130 and is threadedly engaged with the first internally threaded hole 140 of the housing 132, whereby the outer race 130 and the housing 132 of the in-wheel motor unit are fastened to each other. Further, a second bolt 152 is inserted into the mounting hole 146 of the carrier 134 and is threadedly engaged with the second internally threaded hole 142 of the housing 132, whereby the carrier 134 and the housing 132 of the in-wheel motor unit are fastened to each other.

In the installation structure of the present embodiment, the first internally threaded hole 140 and the second internally threaded hole 142 are formed such that the second internally threaded hole 142 extends in a direction orthogonal to the first internally threaded hole 140 so as to intersect the axis of the first internally threaded hole 140. Thus, a first fastening position $A_{3-1}$ and a second fastening position $A_{3-2}$ are located close to each other when viewed in the wheel axis direction. According to the installation structure of the present embodiment, a fastening work for fastening the in-wheel motor unit and the carrier can be performed from the front side and the rear side of the vehicle. Accordingly, the present installation structure is effective in a case in which other constituent components of the vehicle are disposed on the inner side of the in-wheel motor unit in the vehicle width direction.

In the installation structure of the present embodiment, the first fastening position $A_{3-1}$ and the second fastening position $A_{3-2}$ are spaced apart from each other in the direction orthogonal to the wheel axis direction. Accordingly, when a force in the wheel axis direction acts on a first fastening point $a_{3-1}$ and a second fastening point $a_{3-2}$ in dependence on the lateral acceleration generated in the vehicle, the housing 132 suffers from bending moment. In view of this, a distance between the first fastening point $a_{3-1}$ of the first fastening position $A_{3-1}$ and the second fastening point $a_{3-2}$ of the second fastening position $A_{3-2}$ in the direction orthogonal to the wheel axis direction, namely, a distance $D_3$ in the orthogonal direction, is preferably as small as possible. In the installation structure of the present embodiment, the first fastening position $A_{3-1}$ and the second fastening position $A_{3-2}$ are located close to each other when viewed in the wheel axis direction. This means that the distance $D_3$ in the orthogonal direction indicated above is smaller than a distance between the first fastening point $a_{3-1}$ and the second fastening point $a_{3-2}$ in the direction in which the rotation axis of the wheel extends, namely, a distance $D_0$ in the wheel axis direction. Specifically, the distance between the first fastening position and the second fastening position in the direction orthogonal to the wheel axis direction is preferably not greater than 80%, more preferably not greater than 50%, and still more preferably not greater than 30%, of the distance between the first fastening position and the second fastening position in the wheel axis direction. In the installation structure according to the present embodiment, the distance $D_3$ in the orthogonal direction is about 25% of the distance $D_0$ in the wheel axial direction.

In other words, in the installation structure of the present embodiment, the distance $D_3$ in the orthogonal direction is made smaller than a thickness of a portion of the housing 132 in which the first internally threaded hole 140 is formed. Further, the second internally threaded hole 142 is formed so as to intersect the axis of the first internally threaded hole 140, whereby the distance $D_3$ in the orthogonal direction is smaller than a depth of the second internally threaded hole 142.

In the present embodiment, the first internally threaded hole and the second internally threaded hole are formed so as to be orthogonal to each other. The first internally threaded hole and the second internally threaded hole may be formed so as to intersect at an angle other than the right angle. In the present embodiment, the first internally threaded hole and the second internally threaded hole are formed on the same plane. The first internally threaded hole and the second internally threaded hole may be formed so as to be arranged in a skew position relative to each other. In this case, it is possible to further reduce the distance between the first fastening position and the second fastening position in the direction orthogonal to the wheel axis direction.

4. Fourth Embodiment

Figure 9:
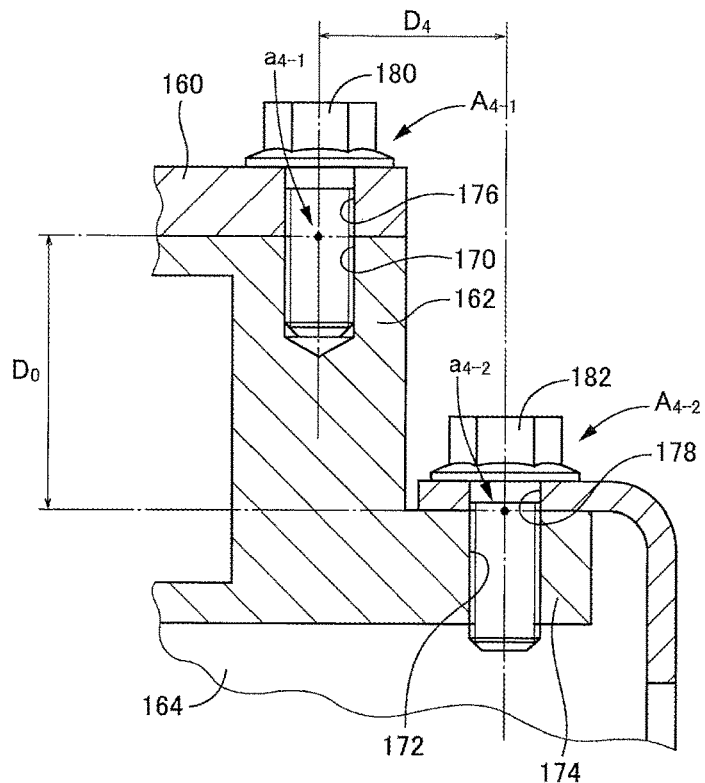
FIG. 9 is an enlarged cross-sectional view of one of a plurality of fastening-position pairs in an installation structure of an in-wheel motor unit according to a fourth embodiment.

Like the installation structure of the in-wheel motor unit according to the third embodiment, an installation structure of an in-wheel motor unit according to a fourth embodiment is configured such that the first fastening position and the second fastening position in each of the plurality of fastening-position pairs are located close to each other in the wheel axis direction. In the installation structure of the in-wheel motor unit of the fourth embodiment, an outer race 160 of the bearing unit and a housing 162 of the in-wheel motor unit are fastened at four first fastening positions, and a carrier 164 and the housing 162 of the in-wheel motor unit are fastened at four second fastening positions, as in the illustrated three embodiments. Each of the four first fastening positions and a corresponding one of the four second fastening positions form a pair, so as to provide four fastening-position pairs. FIG. 9 shows a cross-section of one of the four fastening-position pairs, and the following explanation will be made focusing the one fastening-position pair.

As shown in FIG. 9, a first internally threaded hole 170 is formed in the housing 162 of the in-wheel motor unit so as to correspond to the first fastening position. The first internally threaded hole 170 extends in the wheel axis direction, so as to open to the outer race 160. A second internally threaded hole 172 is formed in the housing 162 so as to correspond to the second fastening position. The second internally threaded hole 172 is formed through a mounting portion 174 of the housing 162 so as to extend in the wheel axis direction. (The mounting portion 174 of the housing 162 is formed so as to extend in the direction orthogonal to the wheel axis direction, namely, so as to extend toward the rear side of the vehicle at the second fastening position shown in FIG. 9.) Thus, the first internally threaded hole 170 and the second internally threaded hole 172 are parallel to each other.

A mounting hole 176 corresponding to the first internally threaded hole 170 is formed in the outer race 160 of the bearing unit. A front-side portion and a rear-side portion of the carrier 164 are formed as extending portions, such that each extending portion overlaps the corresponding mounting portion 174 of the housing 162. A mounting hole 178 corresponding to the second internally threaded hole 172 is formed in a portion of each extending portion of the carrier 164 that is located nearer to the bearing unit than the mounting portion 174 is to the bearing unit. A first bolt 180 is inserted into the mounting hole 176 of the outer race 160 and is threadedly engaged with the first internally threaded hole 170 of the housing 162, whereby the outer race 160 and the housing 162 of the in-wheel motor unit are fastened to each other. Further, a second bolt 182 is inserted into the mounting hole 178 of the carrier 164 and is threadedly engaged with the second internally threaded hole 172 of the housing 162, whereby the carrier 164 and the housing 162 of the in-wheel motor unit 2 are fastened to each other.

In the installation structure according to the fourth embodiment, the first bolt 180 and the second bolt 182 are disposed such that respective heads thereof are adjacent to each other when viewed in the wheel axis direction. That is, a distance between a first fastening point $a_{4-1}$ of a fastening position $A_{4-1}$ and a second fastening point $a_{4-2}$ of a second fastening position $A_{4-2}$ in the direction orthogonal to the wheel axis direction, namely, a distance $D_4$ in the orthogonal direction, is about the same as a width of the head of each bolt 180, 182. Further, the distance in the orthogonal direction $D_4$ is about 70% of a distance $D_0$ between the first fastening point $a_{4-1}$ and the second fastening point $a_{4-2}$ in the direction in which the rotation axis of the wheel extends, namely, a distance $D_0$ in the wheel axis direction. In the installation structure of the present embodiment, therefore, the first fastening position $A_{4-1}$ and the second fastening position $A_{4-2}$ are located close to each other when viewed in the wheel axis direction. Further, a fastening work for fastening the in-wheel motor unit and the carrier can be performed from the bearing unit side, namely, from the outer side in the vehicle width direction, facilitating the fastening work for fastening the in-wheel motor unit and the carrier.

In the installation structures of the in-wheel motor unit according to the illustrated four embodiments, the four fastening-position pairs are identical in structure. The fastening-position pairs having different structures may be used in combination. That is, at least one of the four fastening-position pairs may have a structure different from those of the other fastening-position pairs.

What is claimed is:

1. An installation structure of an in-wheel motor unit including i) a motor for driving a wheel, ii) a speed reducer configured to transmit, to the wheel, rotation of the motor while reducing a speed of the rotation, and iii) a housing in which the motor and the speed reducer are housed, the installation structure being for installing the in-wheel motor unit on a carrier which is a constituent element of a suspension apparatus and which moves upward and downward relative to a body of a vehicle, such that the housing of the in-wheel motor unit is sandwiched by and between the carrier and a bearing unit rotatably holding the wheel,
   wherein the bearing unit and the housing of the in-wheel motor unit are fastened at a plurality of first fastening positions, and the carrier and the housing of the in-wheel motor are fastened at a plurality of second fastening positions the number of which is the same as the number of the plurality of first fastening positions,
   wherein each of the plurality of first fastening positions and a corresponding one of the plurality of second fastening positions form a pair, so as to provide a plurality of fastening-position pairs, and
   wherein the first fastening position and the second fastening position of each of the plurality of fastening-position pairs are located at the same position or located close to each other when viewed in a wheel axis direction, the wheel axis direction being a direction in which a rotation axis of the wheel extends.

2. The installation structure of the in-wheel motor unit according to claim 1,
   wherein, at each of the plurality of fastening-position pairs, an internally threaded hole is formed through the housing of the in-wheel motor unit so as to extend in the wheel axis direction, a mounting hole is formed in the bearing unit, and a mounting hole is formed in the carrier,
   wherein, at the first fastening position of each of the plurality of fastening-position pairs, a bolt is inserted into the mounting hole of the bearing unit and is threadedly engaged with the internally threaded hole of the housing of the in-wheel motor unit, so as to fasten the bearing unit and the housing of the in-wheel motor unit to each other,
   wherein, at the second fastening position of each of the plurality of fastening-position pairs, a bolt is inserted into the mounting hole of the carrier and is threadedly engaged with the internally threaded hole of the housing of the in-wheel motor unit, so as to fasten the carrier and the housing of the in-wheel motor unit to each other, and
   wherein the first fastening position and the second fastening position of each of the plurality of fastening-position pairs are located at the same position when viewed in the wheel axis direction.

3. The installation structure of the in-wheel motor unit according to claim 1,
   wherein, at each of the plurality of fastening-position pairs, a through-hole is formed through the housing of the in-wheel motor unit so as to extend in the wheel axis direction, a mounting hole is formed in the bearing unit, and a mounting hole is formed in the carrier,
   wherein the housing of the in-wheel motor unit, the bearing unit, and the carrier are fastened to one another by a single bolt utilizing the through-hole of the housing, the mounting hole of the bearing unit, and the mounting hole of the carrier, and
   wherein the first fastening position and the second fastening position of each of the plurality of fastening-position pairs are located at the same position when viewed in the wheel axis direction.

4. The installation structure of the in-wheel motor unit according to claim 1, wherein, at the first fastening position of each of the plurality of fastening-position pairs, a first internally threaded hole is formed in the housing of the in-wheel motor unit and a mounting hole is formed in the bearing unit, a bolt being inserted into the mounting hole of the bearing unit and threadedly engaged with the first internally threaded hole of the housing of the in-wheel motor unit, so as to fasten the bearing unit and the housing of the in-wheel motor unit to each other, wherein, at the second fastening position of each of the plurality of fastening-position pairs, a second internally threaded hole is formed in the housing of the in-wheel motor unit so as to extend in a direction intersecting an axis of the first internally threaded hole and a mounting hole is formed in the carrier, a bolt being inserted into the mounting hole of the carrier and threadedly engaged with the second internally threaded hole of the housing of the in-wheel motor unit, so as to fasten the carrier and the housing of the in-wheel motor unit to each other, and wherein the first fastening position and the second fastening position of each of the plurality of fastening-position pairs are located close to each other when viewed in the wheel axis direction.

5. The installation structure of the in-wheel motor unit according to claim 4, wherein the first internally threaded hole extends in the wheel axis direction, and wherein the second internally threaded hole extends in a direction orthogonal to the wheel axis direction and intersects the axis of the first internally threaded hole.

6. The installation structure of the in-wheel motor unit according to claim 1, wherein, at the first fastening position of each of the plurality of fastening-position pairs, a first internally threaded hole is formed in the housing of the in-wheel motor unit and a mounting hole is formed in the bearing unit, a first bolt being inserted into the mounting hole of the bearing unit and threadedly engaged with the first internally threaded hole of the housing of the in-wheel motor unit, so as to fasten the bearing unit and the housing of the in-wheel motor unit to each other, wherein, at the second fastening position of each of the plurality of fastening-position pairs, a second internally threaded hole is formed in the housing of the in-wheel motor unit so as to extend in parallel with the first internally threaded hole and a mounting hole is formed in the carrier, a second bolt being inserted into the mounting hole of the carrier and threadedly engaged with the second internally threaded hole of the housing of the in-wheel motor unit, so as to fasten the carrier and the housing of the in-wheel motor unit to each other, and wherein the first fastening position and the second fastening position of each of the plurality of fastening-position pairs are located close to each other when viewed in the wheel axis direction.

7. The installation structure of the in-wheel motor unit according to claim 6, wherein the first internally threaded hole and the second internally threaded hole extend in the wheel axis direction, and wherein a head of the first bolt and a head of the second bolt are located adjacent to each other when viewed in the wheel axis direction.

8. The installation structure of the in-wheel motor unit according to claim 1, wherein the speed reducer includes an output shaft to the wheel that is coaxial with the wheel, wherein the motor is disposed on one of opposite sides of the speed reducer in the wheel axis direction that is remote from the bearing unit, such that a rotation shaft of the motor is shifted with respect to the output shaft of the speed reducer, and wherein the plurality of fastening-position pairs are provided in a portion of the housing of the in-wheel motor unit in which the speed reducer is housed.

* * * * *